United States Patent [19]

Nagata et al.

[11] 3,731,786

[45] May 8, 1973

[54] CONVEYOR BELT FOR BELT FISSURE DETECTION APPARATUS

[75] Inventors: Zenji Nagata; Masamitsu Ui, both of Komaki; Tokio Fujimoto, Osaka, all of Japan

[73] Assignees: Sumitomo Electric Industries, Ltd., Osaka; Tokai Rubber Industries, Ltd., Aza Utatsu Oaza Kitaloyama, both of Komaki, Aichi Prefecture, all of Japan

[22] Filed: Sept. 21, 1970

[21] Appl. No.: 74,089

[30] Foreign Application Priority Data

Sept. 19, 1969 Japan ......................44/89949

[52] U.S. Cl.....................................198/40, 198/232

[51] Int. Cl..............................................B65g 43/02

[58] Field of Search.......198/40, 193, 232; 324/34 R; 340/259

[56] References Cited

UNITED STATES PATENTS 2,593,284 4/1952 Ewell....................198/193 X

FOREIGN PATENTS OR APPLICATIONS 127,922 5/1959 U.S.S.R. ....................198/232

147,132 10/1961 U.S.S.R. ....................198/232

*Primary Examiner*—Edward A. Sroka

*Attorney*—Carothers and Carothers

[57] ABSTRACT

A conveyor belt designed for employment in combination with a conveyor belt fissure detection apparatus wherein at consecutive intervals there is embedded in the interior of the conveyor belt a loop detection coil consisting of a plurality of conductors each having a flexible stranded core around which is spirally wound a metallic wire. The conductors are bound together by welt threads of synthetic material to insure independent flexibility of the separate conductors as bound together.

5 Claims, 7 Drawing Figures

10 12 11 12 13

13

INVENTORS.
ZENJI NAGATA,
MASAMITSU UI &
TOKIO FUJIMOTO
BY
CAROTHERS & CAROTHERS
THEIR ATTORNEYS

CONVEYOR BELT FOR BELT FISSURE DETECTION APPARATUS

BACKGROUND OF THE INVENTION

This invention relates generally to conveyor belt construction and more particularly to a conductor construction adapted to be embedded in a conveyor belt for use as a loop detection coil in connection with a conveyor belt fissure detection apparatus.

It is well known that conveyor belts, particularly the heavy duty type, are subjected, while in use, to repeated positive and negative bending, when conveying materials from one point to another point. Such conveyor belts, usually made of reinforced rubber type material, are also subjected to impacts of loads carried by the belt as it is being passed over various pulleys, such as, drive pulleys, head pulleys, take-up pulleys, bend pulleys and snub pulleys. Furthermore, in those cases where the conveyor belt is to be guided by trough-forming idlers, the belt is subjected to repeated bending in a direction normal to the longitudinal length of the conveyor belt.

In conveyor belts wherein there is embedded a loop detecting coil at consecutive points along the full length of the belt, the conductor comprising such loop coils must have high durability since it will be subjected to stresses placed upon the conductor due to the frequent positive and negative bending and load impacting imposed upon the conveyor belt.

As a matter of background, a belt fissure detection apparatus comprises an electromagnetic device having exciter and receiving coils placed in proximity to the conveyor belt, usually beneath the belt. A plurality of fissure detecting coils are embedded in the conveyor belt either in the transverse or beltwidth direction of the belt or the longitudinal direction of the belt or both such directions at uniform intervals along the length of the conveyor belt. Such detection coils are composed of wiring, such as the type disclosed and claimed herein, which are embedded in the conveyor belt for the purpose of detecting a fissure in the elastomer structure of the belt. Thus, when a fissure or crack occurs in the belt, whether transversely or longitudinally, the loop detecting coil embedded in the belt will be caused to break at some point which is, thence, detected by a detector circuit of the apparatus causing the operation of an annunciator due to the signal interruption caused by the coil break. This is indicative of the occurrence of a fissure in the belt at the synchronized position of the exciter and receiver coils and the particular detector coil in the conveyor belt involved. The synchronized position means that position where the exciter and receiver coils are in aligned position with a corresponding loop detecting coil in the conveyor belt to form an electromagnetic coupling therewith.

The operating coils which constitute the exciter (oscillator) and receiver coils positioned in proximity to and beneath the conveyor belt in aligned relation with the belt detecting coils embedded therein as the conveyor belt passes continually thereover are each connected to the detectOr circuit. The operating coils in combination with each passing loop detecting coil form an electromagnetic coupling which is broken if a belt fissure has occurred. Further information concerning the operation of the conveyor belt fissure detection apparatus can be obtained from patent application Ser.

No. 24,242, filed Mar. 31, 1970 and the prior art referred to therein.

Due to the stress and bending forces placed in these embedded loop detecting coils in such conveyor belts, there has been a long felt need to provide a conductor construction of sufficient durability as to be lasting throughout the life of the conveyor belt. If the loop coil is not imparted with such durability, breakage of the loop coil embedded in the belt which takes place without the occurrence of fissure within the belt conveyor structure or due to a crack in that the belt surface of no real serious consequence, the conveyor belt detection circuit will issue a false alarm indicating the occurrence of a fissure in the conveyor belt which, in fact, has not actually occurred.

SUMMARY OF THE INVENTION

It is the prime purpose of the present invention to provide a conductor for loop detection coils of sufficient durability to last the lifetime of the conveyor belt in which such coils are embedded.

Another object of this invention is the provision of a loop coil embedded in a conveyor belt comprising a plurality of conductors, having an elastic or flexible stranded type coil highly resistant to bending over which the wire is coiled, arranged in aligned planer rows to form a flat conductor band. The conductors are held in aligned planer position by being bound together by means of welt threads of synthetic material.

Other objects and advantages appear hereinafter in the following description and claims.

The accompanying drawings show, for the purpose of exemplification without limiting the invention or the claims thereto, certain practical embodiments illustrating the principles of this invention wherein:

Figure 1:
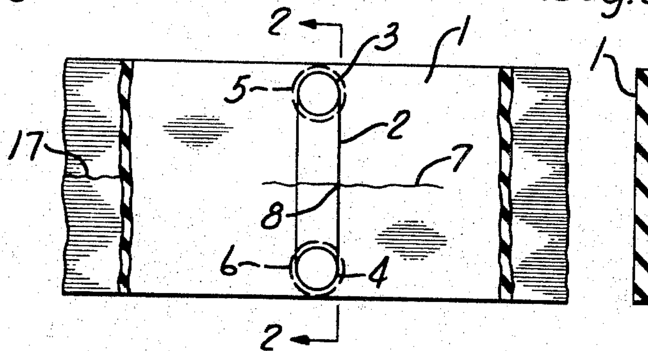
FIG. 1 is a plan view of a portion of a conveyor belt with a sectional layer of the belt cut away showing the employment of the loop detecting coils and their relationship with the exciter and receiver coils.
Figure 2:
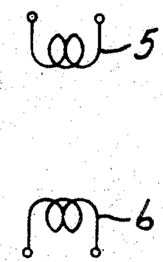
FIG. 2 is a cross sectional view of the conveyor belt of FIG. 1 taken along the line 2—2 of FIG. 1.
Figure 3:
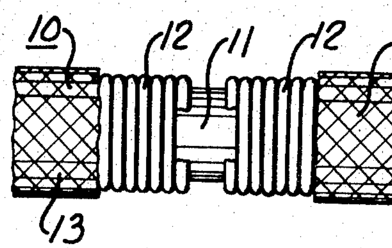
FIG. 3 shows a detail of the wire construction making up each of the conductors forming the detector loop coils.
Figure 4:
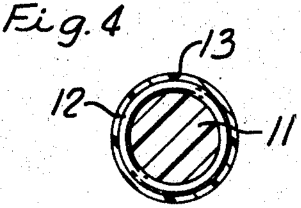
FIG. 4 is a cross sectional view of the conductor of FIG. 3.

For the purpose of background in connection with the conveyor belt construction comprising this invention, reference is made to FIGS. 1 and 2 where there is shown embedded in the conveyor belt 1 the loop detecting coil 2 extending over the width of the conveyor belt 1. Each end portion of the loop coil 2 is coiled in such a manner to form the sensor coil portions 3 and 4.

The operating coils comprising the exciter coil 5 and the receiver coil 6 are positioned beneath the conveyor belt 1 as shown in FIGS. 1 and 2 to be in aligned relation with the sensor coil portions 3 and 4 as the conveyor belt 1 is passing over the operating coils. As indicated previously, these exciter coils 5 and 6 are connected to the detector circuit of the belt fissure detection apparatus of the type shown in patent application Ser. No. 24,242 filed Mar. 13, 1970 wherein the operation of such apparatus is thoroughly discussed and disclosed.

When the exciter coils 5 and 6 are in aligned position with the sensor coil portions 4 and 5 as shown in FIG. 1, an electromagnetic coupling is formed which functions to cause the detector circuit to be inoperative. However, if a fissure or crack occurs in the conveyor belt as indicated at 7 in FIG. 1, then, the loop coil 2 will also be broken or disconnected such as indicated at 8 so that a closed electromagnetic circuit cannot be created between the exciter coil 5 and the receiver coil 6 through the use of the loop detector coil 2. As a result, the detector will actuate an annunciator indicative of a fissure occurring at the synchronized position of the exciter coils 5 and 6 and the corresponding sensor coil portions 3 and 4 shown in FIG. 1. Thus, as long as a fissure 7 does not occur within the belt, the oscillator coil 5 will electromagnetically connect to an approaching sensor portion 3 as the conveyor belt 1 is traveling in its longitudinal direction thereby producing, at the point of passing of the loop detecting coil 2 over the operating coils, an electromagnetic signal to be imposed upon the receiver coil 6 through the sensor portion 4 of the loop detecting coil 2.

In order to detect the occurrence of a crack or fissure in the conveyor belt 1 as a practical matter, a sinusoidal current of some 10 KHz to some 100 KHz is applied to the exciter or oscillator coil 5. When the above-mentioned synchronized position is established as the belt 1 travels in its longitudinal direction, this synchronized position being shown in FIG. 1, the electromagnetic connection through the loop detector coil 2 is established between the exciter coil 5 and the receiver coil 6. Thus, if the fissure 7 occurs in a longitudinal direction of the conveyor belt 1 caused, for example, by the impact of a load placed on the conveyor belt and to be transported thereupon and brings about another point (such as mined minerals) to the breakage of the loop detecting coil such as indicated at 8, no electromagnetic connection can take place between the exciter coil 5 and the receiver coil 6. Therefore, with no signal being received on the receiver coil 6, the detector circuit is placed into operation to appraise the conveyor belt operator that a fissure has occurred in the conveyor belt 1 in the synchronized position.

As previously explained, however, the breakage of the loop detecting coil 2 has occurred in the past, not due to the development of a fissure or crack as illustrated at 7 in FIG. 1, but rather, due to the continual stress bending forces applied on such conveyor belt when traveling over various types of pulleys and subject to frequent bending such as around curves or causing the conveyor belt to be guided by trough-forming idlers, all of which have been previously mentioned. Also, a small crack, such as illustrated at 7 in FIG. 1, may occur on the belt surface due to belt use but not considered a belt fissure since the crack is only on the belt surface. However, the loop detecting coil is found to be broken. Such breakages in the loop detecting coils 2 are obviously highly undesirable since indication is given that a fissure has occurred in the belt when this condition has, in fact, not actually occurred.

Therefore, it is the important advantage of the present invention to provide a conveyor belt wherein a conductor is adaptable to be employed as a loop detecting coil 2 having high overall durability.

As demonstrated in FIGS. 3 through 6, the conductor 10 forming the loop detecting coil 2 consists of an elastic or flexible stranded core made of material having high resistance to bending stress and composed of such materials as polyester, nylon, or glass fibers made in the form of strands, elongated yarns or fibers bound together to form the core material. This flexible stranded core as shown at 11 is bound with a wire material or a flat strip of metallic material composed of, for example, a copper alloy which is spirally wound over the flexible stranded core 11 as indicated at 12. A suitable cover 13 may be provided over the spirally wound conductor wire 12 as indicated at 13.

Figure 5:
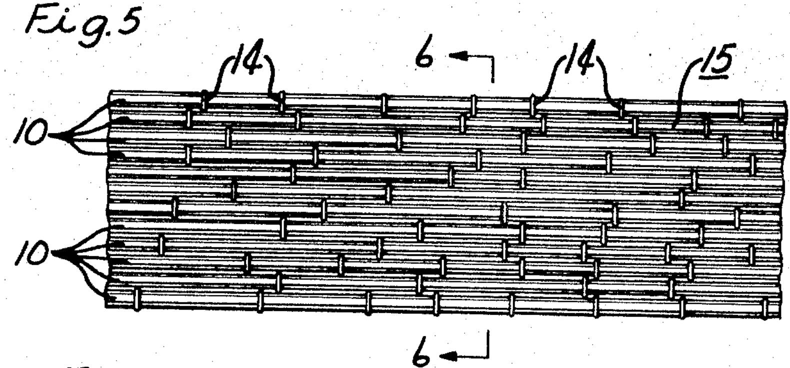
FIG. 5 illustrates the arrangement of the conductors for purposes of being embedded in the conveyor belt as a loop detecting coil.
Figure 6:
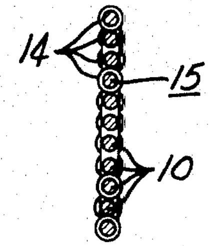
FIG. 6 is a cross sectional view taken along the line 6—6 of FIG. 5.

A plurality of such conductors are then bound together by means of arranging them in a row as indicated in FIGS. 5 and 6 and then bound together by welt threads indicated at 14 composed of synthetic type materials such as nylon yarn. The overall appearance therefor of the completed detecting coil 2 is an aligned arrangement of a plurality of conductors 10 secured together by the welt threads 14 in a single plane to form a band 15 of conductors 10.

It should be noted that one conductor 10 or any number thereof to form the band 15 may be employed as the loop detecting coil 2.

Figure 7:
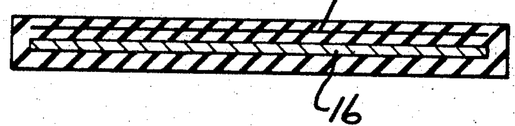
FIG. 7 is another cross sectional view of a conveyor belt similar to that shown in FIG. 2 except depicting the provision of a reinforcing layer.

The flat band 15 of conductor wires as shown in FIG. 5, may then be formed into the loop detecting coil 2 and thereafter embedded in the conveyor belt 1 preferably at a position above a reinforcing layer 16 as indicated in FIG. 7. Such reinforcing layers 16 may be of metallic mesh material or other suitable strengthening material to give rigidity to the conveyor belt as well as additional reinforcing strength to enhance its overall durability and life as well as lend some protection to the embedded loop detecting coils from imposed stresses and bending forces.

The construction of the loop detecting coil 2 as above explained, provides improved flexibility together with the provision of sufficient resistance to the bending forces and stresses placed upon the conductor 10 as embedded in the conveyor belt 1. Therefore, the detecting coils can withstand continual flection over a long period of service without any deterioration or breakage of the wire 12 in the conductors due to such continued flexing or bending stress.

The use of the welt threads 14 provides for additional flexibility for the conductors 10 one relative to another in forming the conductor bands 15. Thus, if a minor fissure 7 appears in the conveyor belt 1 breaking only a portion of the conductor 10 making up the conductor band 15, the loop detecting coil 2 is insured to perform its normal function. If a crack appears on the surface of the conveyor belt 1 as depicted, for example, at 17 in FIG. 1 which is not indicative of a real belt fissure, that is, a fissure extending through at least a substantial thickness of the conveyor belt 1 for a substantial longitudinal length thereof, such a crack 17 is not detrimental to continue the use and operation of the conveyor belt. Thus, by embedding in the conveyor belt 1 the conductor band 15 with the bandwith extending upwardly through the conveyor belt 1, any cracks appearing on the surface of the conveyor belt, may possibly break some of the conductors 10 leaving the additional conductors 10 therebelow and making up the remainder of the conductor band 15 to perform the normal function of the electromagnetic coupling developed between the exciter coil 5 and the receiver coil 6 through the respective sensor portions 3 and 4 of the loop detecting coil 2. The conductor band 15 embedded in the conveyor belt in this manner has sufficient ductility and resistance against bending fatigue due to the provision of a resilient or flexible core 11 to enhance the overall durability and shock resistance of the conductor wire 12. At the same time, the welt threads 14 permit individual flexing and bending of the conductor 10 one relative to another or independently thereof, as bound together to form the conductor band 15 embedded in the conveyor belt 1. Also, the conductor band embedded in this manner will insure that a real belt fissure has occurred through a substantial thickness of the conveyor belt.

We claim:

1. A conveyor belt for employment in conjunction with a conveyor belt fissure detection apparatus comprising an elongated flexible belt having embedded therein at consecutive intervals loop detection coils, each such coil comprising a plurality of conductors each having a flexible stranded core around which is spirally wound a metallic wire, said conductors bound together in aligned planer position to form a conductor band, said loop detection coils being embedded within the conveyor belt with the width of the conductor band positioned in a direction within the conveyor belt transverse to the longitudinal length thereof.

2. In a conveyor belt having embedded therein electromagnetic loop detection coils for employment in conjunction with a conveyor belt fissure detection apparatus, wherein each of said loop detection coils comprises a plurality of aligned conductor wires flexibly bound together and having high durability against bending fatigue, each of said conductor wires consisting of a flexible core made of material having high resistance to bending stress with a metallic conductor spirally wound along the length of said core.

3. The loop coils of claim 2 characterized by welt threads employed to bind together said conductor wires arranged in aligned relation to form a flexible conductor band.

4. The loop coils of claim 3 characterized by being embedded in the conveyor belt at intervals along its length in a direction transverse relative to the longitudinal extent of the conveyor belt.

5. The loop coils of claim 2 characterized in that said flexible core is composed of one or more of the materials from the group consisting of polyester, nylon or glass fibers.

* * * * *